(12) United States Patent
Mowdy

(10) Patent No.: US 11,485,624 B2
(45) Date of Patent: Nov. 1, 2022

(54) METHOD OF CONNECTING A VENT TUBE TO A BOTTLING MACHINE

(71) Applicant: M&M Machinery Services, Inc., Fort Worth, TX (US)

(72) Inventor: Alton W. Mowdy, Fort Worth, TX (US)

(73) Assignee: M&M Machinery Services, Inc., Fort Worth, TX (US)

( * ) Notice: Subject to any disclaimer, the term of this patent is extended or adjusted under 35 U.S.C. 154(b) by 0 days.

(21) Appl. No.: 17/148,171

(22) Filed: Jan. 13, 2021

(65) Prior Publication Data
US 2021/0130147 A1    May 6, 2021

Related U.S. Application Data

(62) Division of application No. 15/465,248, filed on Mar. 21, 2017, now Pat. No. 10,913,645.

(60) Provisional application No. 62/468,145, filed on Mar. 7, 2017, provisional application No. 62/311,727, filed on Mar. 22, 2016.

(51) Int. Cl.
    *B67C 3/26*      (2006.01)
    *F16L 37/113*      (2006.01)

(52) U.S. Cl.
CPC .............. *B67C 3/2614* (2013.01); *B67C 3/26* (2013.01); *B67C 2003/2602* (2013.01); *B67C 2003/2668* (2013.01); *B67C 2003/2674* (2013.01); *F16L 37/113* (2013.01)

(58) Field of Classification Search
CPC .............. B67C 3/26; B67C 2003/2602; B67C 2003/2674; B67C 2003/2668; F16L 37/113
See application file for complete search history.

(56) References Cited

U.S. PATENT DOCUMENTS

| | | |
|---|---|---|
| 2,797,110 A | 6/1957 | Covington |
| 3,450,175 A | 6/1969 | Norwood |
| 3,640,465 A | 2/1972 | Hicks |
| (Continued) | | |

FOREIGN PATENT DOCUMENTS

| | | |
|---|---|---|
| CN | 102701130 | 10/2012 |
| DE | 202007014205 | 9/2008 |
| (Continued) | | |

*Primary Examiner* — Marina A Tietjen
(74) *Attorney, Agent, or Firm* — Fitch, Even, Tabin & Flannery LLP

(57) ABSTRACT

A method of connecting a vent tube to a bottling machine comprising providing a vent tube having a vent tube alignment mechanism, a receiver defining a through-opening and a receiver alignment mechanism, and a biasing mechanism for biasing against at least a portion of the vent tube. Aligning the vent tube with the through-opening and the vent tube alignment mechanism with the receiver alignment mechanism, inserting the vent tube into the receiver against the biasing mechanism, rotating the vent tube such that the vent tube alignment mechanism is not aligned with the receiver alignment mechanism, and locking the vent tube to the receiver using the biasing mechanism to bias the vent tube alignment mechanism out of alignment with the receiver alignment mechanism to form a positive locking feature that keeps the vent tube connected to the receiver throughout bottling machine operations.

13 Claims, 16 Drawing Sheets

(56) References Cited

U.S. PATENT DOCUMENTS

| | | | |
|---|---|---|---|
| 3,736,966 | A | 6/1973 | Dichiara |
| 3,858,910 | A | 1/1975 | Oetiker |
| 4,049,030 | A | 9/1977 | Abramoska |
| 5,425,558 | A | 6/1995 | Dennany |
| 5,878,797 | A | 3/1999 | Manuel |
| 6,634,679 | B1 | 10/2003 | Stieler |
| 7,523,771 | B2 | 4/2009 | Stavrakis |
| 8,887,762 | B2 | 11/2014 | Densel |
| 2011/0290375 | A1 | 12/2011 | Hertz |
| 2012/0174529 | A1 | 7/2012 | Clusserath |
| 2013/0105041 | A1 | 5/2013 | Krulitsch |
| 2013/0112315 | A1 | 5/2013 | Clusserath |
| 2014/0208699 | A1 | 7/2014 | Reiniger |
| 2015/0191260 | A1 | 7/2015 | Cook |
| 2015/0217983 | A1 | 8/2015 | Clusserath |
| 2017/0268709 | A1 * | 9/2017 | Gibson ................ F16L 37/252 |
| 2017/0276279 | A1 | 9/2017 | Mowdy |

FOREIGN PATENT DOCUMENTS

| | | | |
|---|---|---|---|
| DE | 102011075237 A1 * | 11/2012 | ............... B67C 3/26 |
| DE | 202012012913 U1 * | 4/2014 | ............... B67C 3/26 |
| EP | 2930140 | 1/2017 | |
| GB | 931498 | 7/1963 | |
| WO | 2013139413 | 9/2013 | |

* cited by examiner

METHOD OF CONNECTING A VENT TUBE TO A BOTTLING MACHINE

CROSS-REFERENCE TO RELATED APPLICATIONS

This application is a divisional of U.S. patent application Ser. No. 15/465,248, filed Mar. 21, 2017, and claims the benefit of U.S. Patent Application No. 62/468,145, filed Mar. 7, 2017, and U.S. Patent Application No. 62/311,727, filed Mar. 22, 2016, which are incorporated herein by reference in their entirety.

FIELD

This invention relates generally to vent tubes, mating relationships between vent tubes and the valve inserts or gas stems they connect to, and bottling machines that use same, and, more particularly, to a quick connect mechanism for connecting vent tubes to valve inserts used in bottling machines and methods relating to same.

BACKGROUND

Bottling machines can be used to fill a variety of containers with a variety of fluids. Bottling machines include vent tubes which extend into the container being filled. The vent tubes are hollow to allow gas to flow into and out of the bottle through the vent tube. The vent tube may also include an external structure, such as a spreader or umbrella, which alters the flow of liquid being added to the bottle and these are typically designed in a manner that allows the liquid to be added to the bottle more quickly or efficiently (e.g., reducing foaming, etc.) to speed up the bottle filing or bottling process. Vent tubes frequently need to be changed to accommodate different containers and/or different fluids. The bottling machine cannot run while the vent tube is being changed. Current attachment methods for vent tubes include threaded attachments and press fit attachments. Threaded attachments were the main way vent tubes were connected to the valve insert (also known as a gas stem or vent tube insert) of the bottle filing station of the bottling machine. One problem with such threaded connections is that they often require the use of tools, such as wrenches, which are not often readily available. Thus, workers often use the wrong tool, such as a pliers (e.g., such as a tongue and groove lock pliers) to grip and loosen the vent tube and this often causes damage to the vent tube (e.g., bending, scraping, etc.). This use of tools to tighten screw-in vent tubes can also lead to over torqueing problems which can result in damage to the valve cover. Threaded vent tubes also become problematic in that during the heated cleaning cycles, threads expand making the vent tubes loose fitting and, thus, capable of inadvertent removal. The need for tools and rotating or screwing the vent tube in and out also slows the process down for changing the bottling machine over from one set of vent tubes to a different set of vent tubes (e.g., such as when changing the bottling line to fill a different type of bottle or to fill bottles with a different liquid).

An attempt has been made to address these issues, which involves the use of a press fit configuration between the vent tube and valve insert. As will be discussed further below, these vent tubes are often difficult to remove and insert in the valve insert, which becomes an even bigger problem when dealing with large bottling machines that may have seventy to well over one hundred vent tubes needing to be changed. In addition, another problem associated with such press fit vent tubes is that they often are installed incorrectly and can slip out or fall into a bottle during the bottle filling process. If this happens, the entire production line has to be shut down until the missing vent tube is located (i.e., it is not enough to just throw out the bottles, but rather the missing peace has to be found to account for same and ensure that it did not make its way into a bottle that leaves the bottler's facility). Given that many high-speed bottling machines fill over one thousand bottles per minute, it should be clear how a lost vent tube may take a very long time to find even if it was noticed as missing soon after it slipped out of connection with the valve insert.

Thus, conventional vent tubes and the way they are connected to valve inserts at the bottling filing stations of bottling machines have significant problems (e.g., they are time consuming to change, often result in large amounts of downtime for the machine, etc.).

Accordingly, it has been determined that a need exists for a vent tube with an improved connecting means, for bottling equipment that utilizes same and related methods.

BRIEF DESCRIPTION OF THE FIGURES

Embodiments of the invention are illustrated in the figures of the accompanying drawings in which.

Elements in the figures are illustrated for simplicity and clarity and have not necessarily been drawn to scale or to include all features, options or attachments. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/ or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

Similar features shown in the different embodiments illustrated in the figures above share similar reference numbers. Each element has a three digit reference number, with the first digit representing the embodiment number and the last two digits representing the component. For example, element 110 is the vent tube in embodiment 1 and element 310 is a vent tube in embodiment 3. Other than the differences explicitly described and/or shown, elements with corresponding elements are understood to be substantially similar.

DESCRIPTION OF THE INVENTION

Many variations of vent tubes in valve insert assemblies (also known as gas stem or vent tube insert assemblies) are discussed herein and even further are contemplated in view of this disclosure. The vent tubes discussed herein are configured, and designed, to quickly attach and detach to the receiver portion of the gas stems in order to allow for rapid changeover from one bottle filling setup to another. The vent tubes herein can vary drastically in length, diameter, and shape. In many applications, it is desirable to have a wide variety of vent tubes, each having the same attachment means so that they can be interchanged to allow a bottling machine or bottle filing line to be used to fill containers of different types (e.g., shapes, sizes, configurations, etc.) and/ or fill containers with different fluids. As mentioned above, Applicant claims the benefit of U.S. Patent Application No. 62/468,145, filed Mar. 7, 2017, and U.S. Patent Application No. 62/311,727, filed Mar. 22, 2016, which are incorporated herein by reference in their entirety. Applicant further incorporates herein by reference in its entirety U.S. Design application No. 29/597,122, filed Mar. 14, 2017.

Figure 1A:
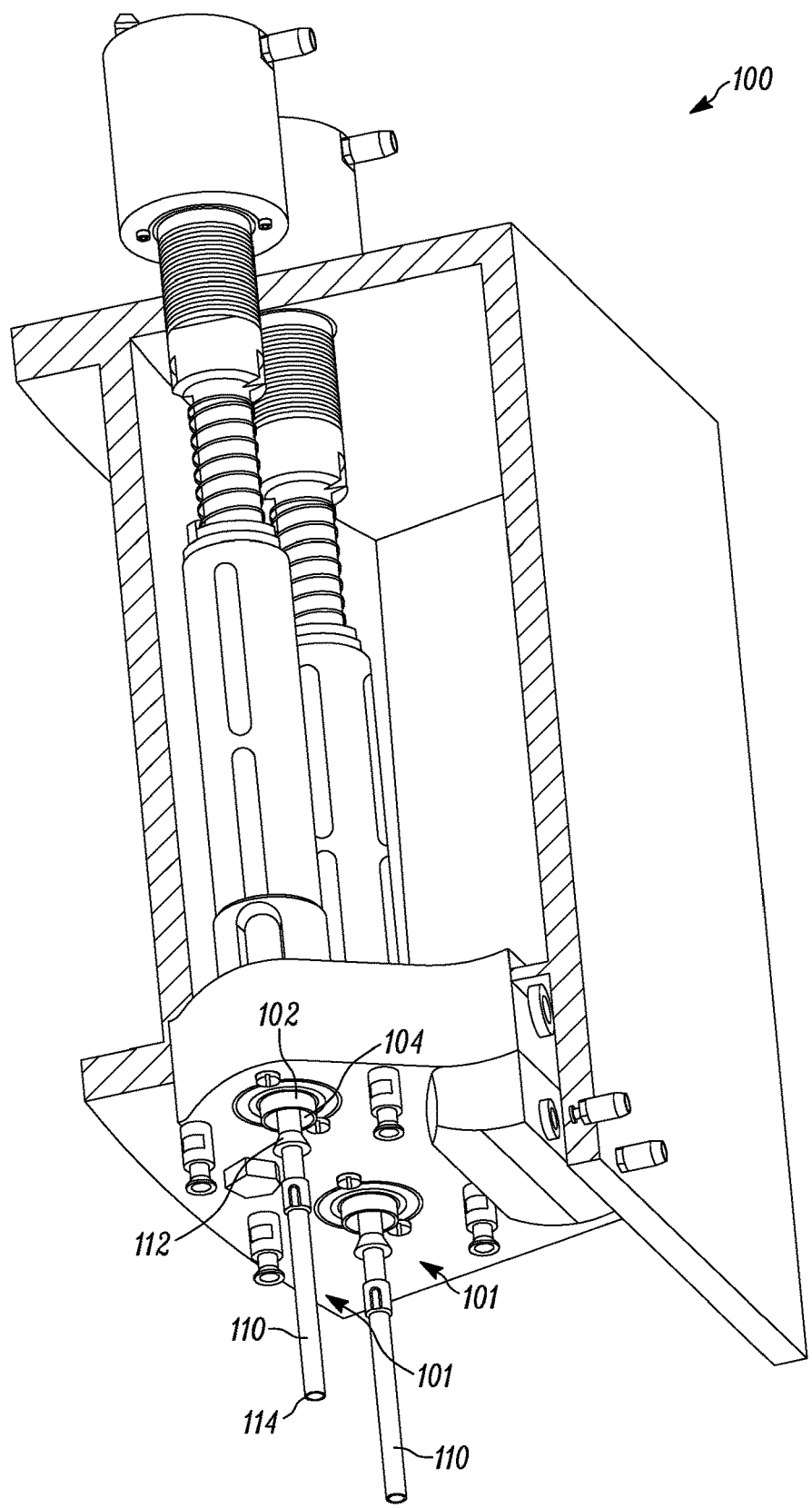
FIG. 1A is a perspective view of a bottle filling station of a bottling machine.

FIG. 1A shows a perspective view of a bottle filling station 100 of a bottling machine (or beverage bottling plant). The bottling machine 100 includes a plurality of gas stem assemblies 101. Each gas stem assembly 101 has a gas stem base 102, a gasket 104, and a vent tube 110. The vent tube 110 is attached to the gas stem base 102. The vent tube 110 comprises a hollow, cylindrical body having an optional spreader 112 extending radially outward and an opening 114. The spreader 112 as shown is shaped as an umbrella or flange, however other shapes can be used depending on the liquid and bottle being used (e.g., flanges having different radius of curvature may be used for different fluids in order to optimize the filling process). The opening 114 extends the entire length of the vent tube 110 and allows gas to flow from the gas stem assembly 101 to a bottle positioned around the vent tube 110 (or that the vent tube 110 disposed in).

Figure 1B:
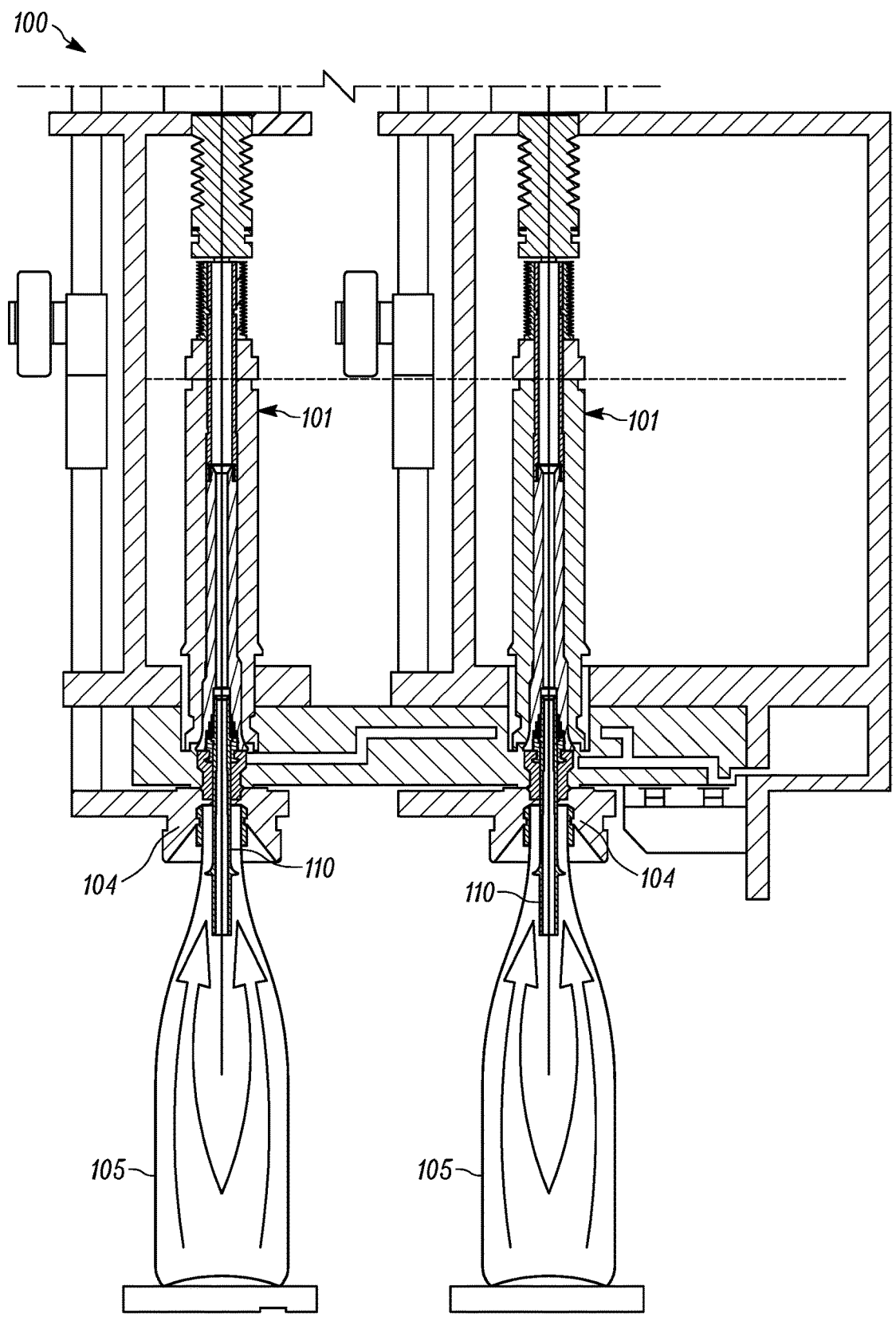
FIG. 1B is a side view in partial cross section of the bottle filing station of FIG. 1A.

A side view of the bottling filling station 100 in operation is shown in FIG. 1B. Bottles 105 are pressed up against the gasket 104 forming an air tight seal. Compressed gas, such as carbon dioxide ($CO_2$) is then released or pumped into the bottles 105 through the opening 114 of the vent tubes 110. After the bottles 105 are pressurized, liquid is added. The liquid can be any liquid, such as soda, beer, juice, carbonated water, water, etc. The liquid is released along the outer surface of the vent tubes 110. The spreader 112 alters the flow of the liquid so that bottles 105 can be filled at a higher rate without excessive foaming, etc. In some embodiments, the spreaders 112 are shaped such that the liquid flows along the inside wall of the bottles 105. As the liquid enters the bottles 105, gas is vented from the bottles 105 through the openings 114 in the vent tubes 110 in order to maintain a constant pressure. Examples of bottling machines and bottle filling stations are also disclosed in U.S. Pat. No. 7,647,950 B2 (issued Jan. 19, 2010) and U.S. Patent Application Publication No. 2015/0217983 A1 (published Aug. 6, 2015), which are both owned by KHS GmbH (one of the larger makers of these types of machines) and are incorporated herein by reference in their entirety in order to keep this application brief and avoid the need to repeat details that can be found elsewhere.

Figure 1C:
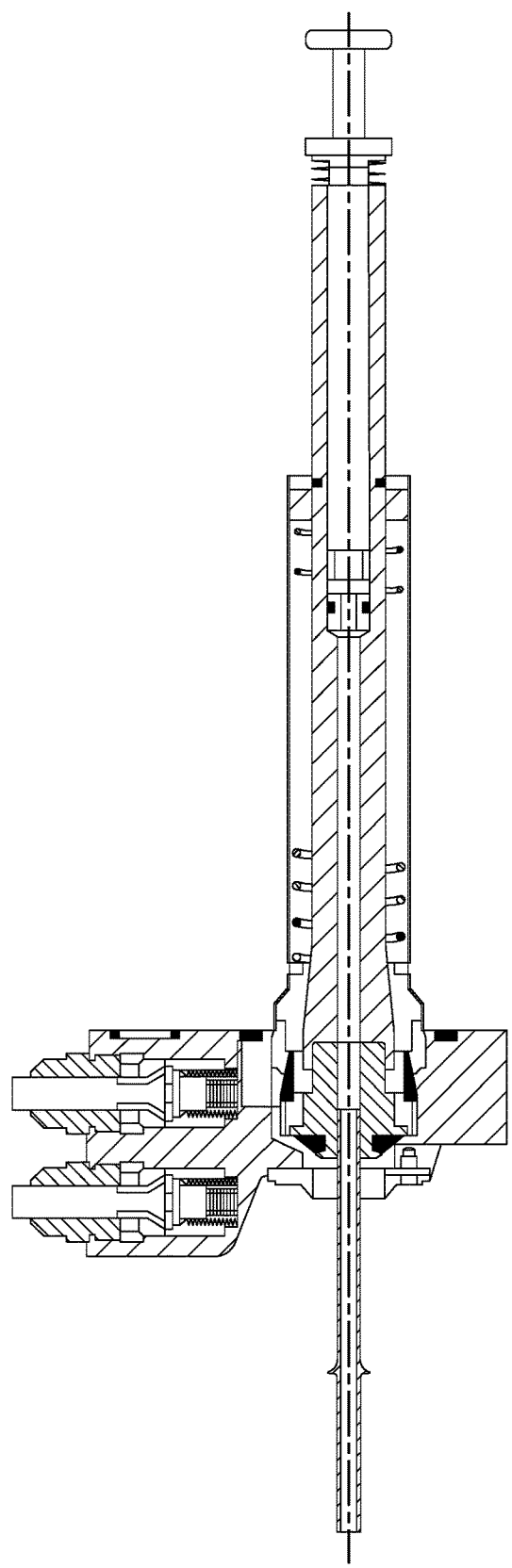
FIG. 1C is a cross sectional view of another prior art valve assembly for use in a bottling machine showing the vent tube and gas stem in more detail.

FIG. 1C illustrates a more detailed version of a prior art valve assembly having a gas stem 102, receiver 130, and vent tube 110. The gas stem 102 includes a guide tube 3 that forms the outer body of the gas stem 102. A large portion of the gas stem 102 is located within a housing comprising an upper housing 7 and lower housing 14. The gas stem 102 is slidable within the housings 7, 14 and biased with a spring 6. The gas stem 102 can slide downward from the housing into a first extended position, or can slide upward into the housing to be in a second retracted position which is shown in FIG. 1C. The outer surface of the gas stem 102 includes one or more grooves for o-rings 4 which form a seal between the gas stem 102 and the upper housing 7.

Figure 2:
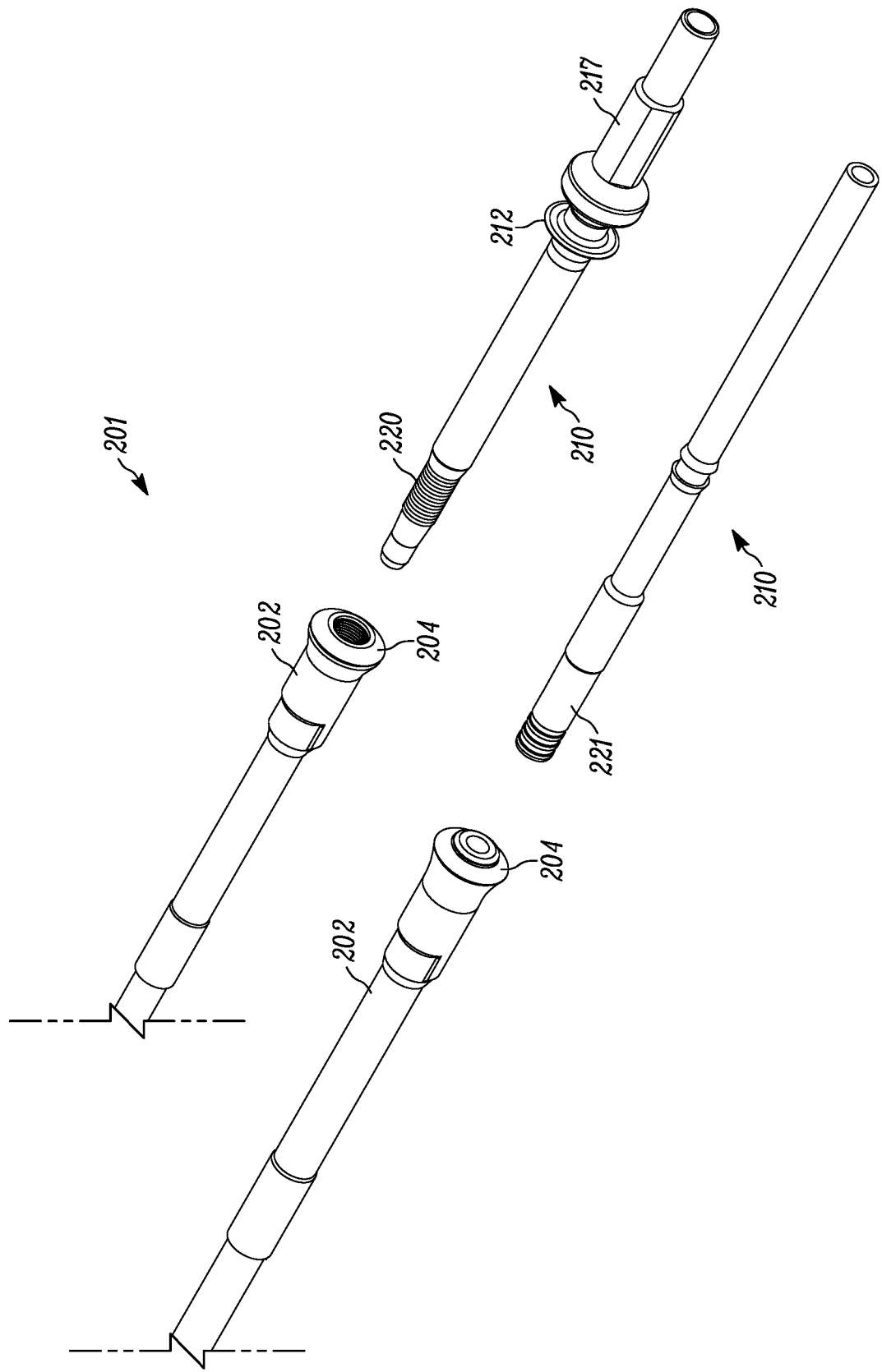
FIG. 2 illustrates a pair of gas stems and vent tubes having prior art attachment means.

FIG. 2 illustrates two prior art gas stem assemblies 201. The gas stem assemblies 201 comprise gas stem bases 202 and vent tubes 210. The vent tubes 210 attach to the gas stem bases 202 via attachment means 220, 221. The first attachment means 220 comprises threads. The male threads of the attachment means 220 located on one end of the vent tube 210 interact with female threads on the interior of the gas stem base 202 in order to securely attach the vent tube 210 to the gas stem base 202. In most instances, workers need a tool, such as a wrench, to screw or unscrew the vent tube 210, thus flat surfaces 217 are formed into the vent tube 210 so that the wrench or pliers do not slip. In practice, however, most workers do not carry a wrench with them or keep one nearby and, thus, they end up either using their hands and only getting the vent tube hand tight (which varies from person-to-person and can lead to a loosened vent tube falling out during operation of the equipment) or using a pliers (e.g., a tongue and groove pliers, clamping pliers, etc.) which often can cause damage to the equipment (e.g., scratching or bending of the vent tube, neighboring vent tubes, etc.). Even if a wrench or other tool is readily available, the need to use a tool and the time it takes to unscrew or screw-in the vent tube further slows down the process of changing over the bottling machine to run a different line of bottles.

The second attachment means 221 is a press fitting. The press fitting comprises at least one ring made of a compressible material, such as rubber or silicon, fixed to the vent tube 210 near one end. When that end of the vent tube 210 is pressed into the gas stem base 202, the ring deforms to match the shape of the interior surface of the gas stem base 202, thus forming a seal. The high friction between the ring and the interior of the gas stem base 202 resists removal of the vent tube 210. Thus it takes a large amount of force and time in order to switch out the vent tubes 210. A main problem with this type of friction fit or passive locking configuration, however, is that it often results in an improperly installed vent tube falling out during bottle filling, which causes the entire production line to be stopped and searched until the lost vent tube is found. Most plants are prohibited from re-starting production until the missing part is accounted for in order to ensure it does not find its way out into the hands of a consumer. Given that some of the high speed bottling machines or plants can fill one thousand bottles per minute, one can imagine how long it may take to find the missing vent tube (and that is assuming the missing part was detected right away, which is not always the case). In practice, workers often end up using tools such as pliers to grip the vent tube to assist the worker in removing or installing same and these tools often can damage the vent tube and/or damage surrounding machinery components when the vent tube is removed with force and/or when the tool slips from its intended position.

Thus, it is clear in view of the above-identified problems associated with existing vent tubes that a need exists for an easier vent tube attachment mechanism and system. In a preferred form, such a solution will be quick and easy to perform so as to reduce downtime associated with product line change overs and the like. In addition, it would be preferable to have a positive locking feature that actively secures the vent tube to the gas stem rather than the screw thread arrangement or passive locking feature of the friction fit embodiment illustrated in FIG. 2. The conventional vent tube connection mechanisms (e.g., threaded or friction fit) often can be connected inappropriately and end-up causing the bottling machinery to be shut down for some time while workers search the bottles for missing vent tubes that have fallen off the gas stem and are now somewhere downstream in the process within a bottle. These shutdowns for lost parts are often as problematic (if not more so) as the shutdowns required to do a changeover from one bottle filing setup to another. As mentioned above, such shutdowns can also require the inspection of voluminous amounts of product before the production line is allowed to start-up again and, thus, create significant downtime, wasted labor hours and loss of production (e.g., downtimes could be minutes, hours or days depending on how much product has to be inspected). The lost items also run the risk of damaging the bottle and requiring inspection of same at a later stage in the process. For example, having a metal vent tube fall off and into a glass bottle can lead to a concern over chipped glass in the bottle, etc. The existing vent tube connection means (threaded or friction fit) also fatigue early due to misuse in handling (e.g., operator using wrong tools, removing improperly, stripping threads, worn o-rings, etc.) due to all of the production line changeovers where different vent tubes are inserted and removed repeatedly to fill different bottles or liquids.

Figure 3:
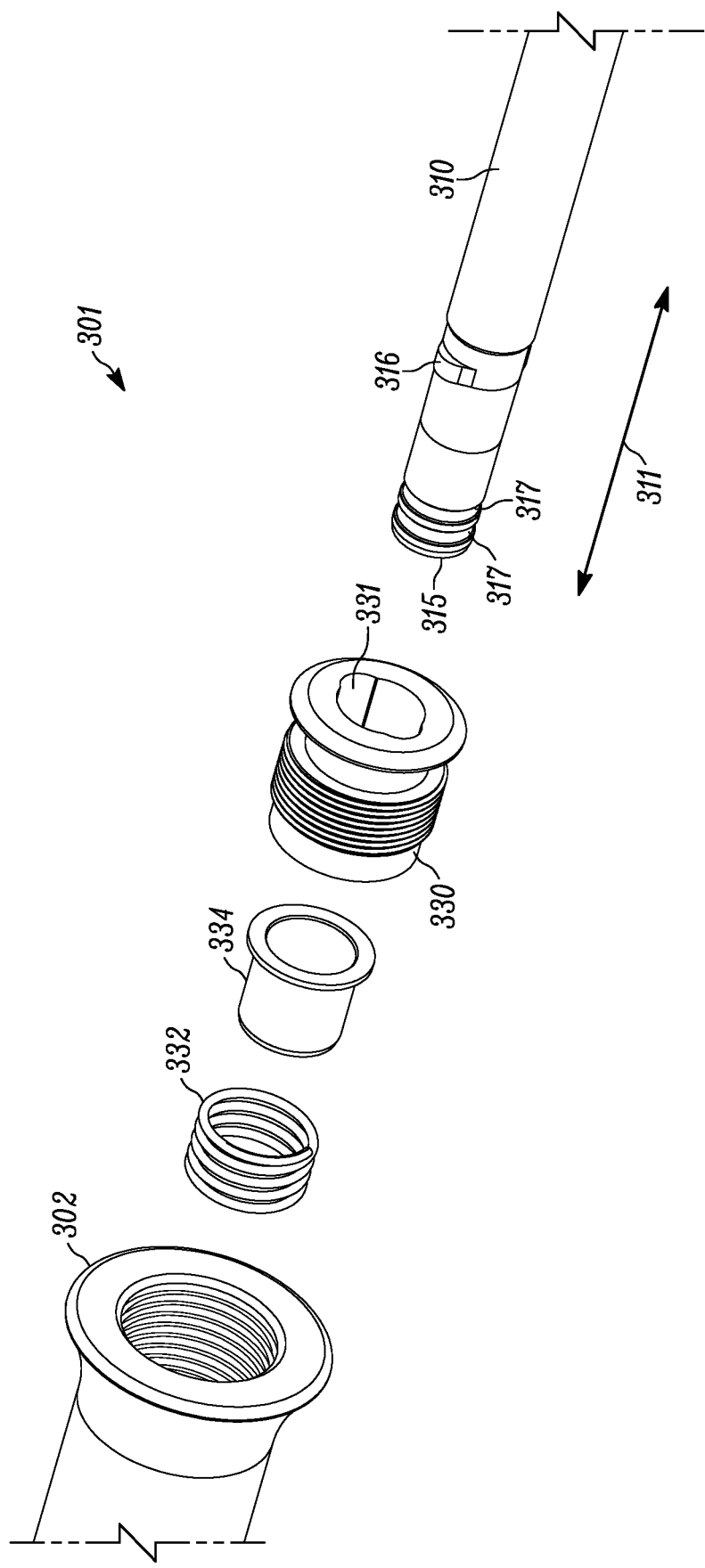
FIG. 3 illustrates a disassembled gas stem assembly according to an embodiment of the present invention.
Figure 4A:
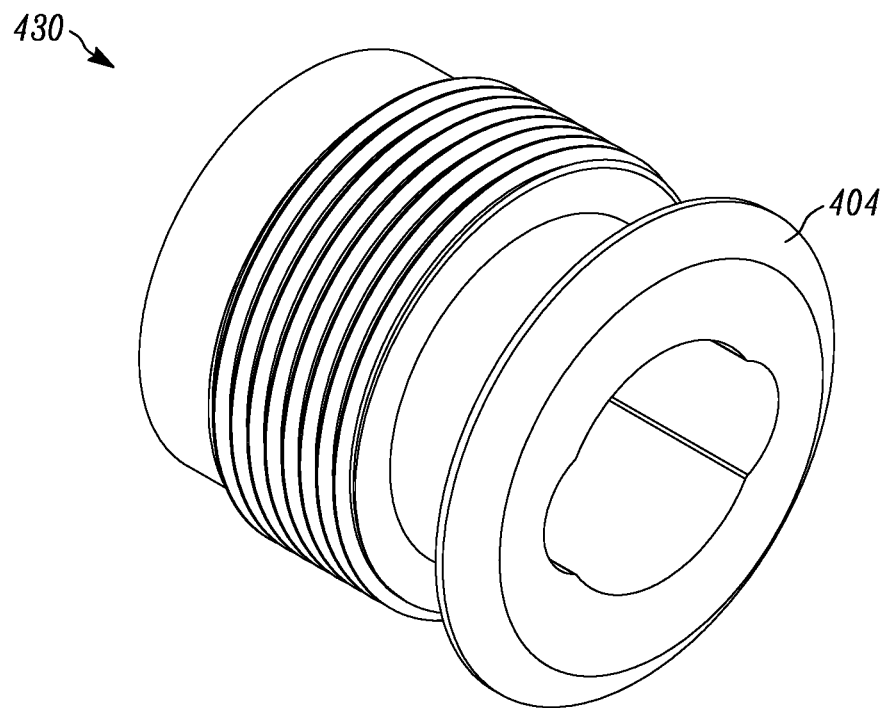
FIGS. 4A-D are perspective, side elevation, end elevation and cross sectional views, respectively, of a receiver according to an embodiment of the present invention with the cross section being taken along line 4D-4D in FIG. 4C.
Figure 4B:
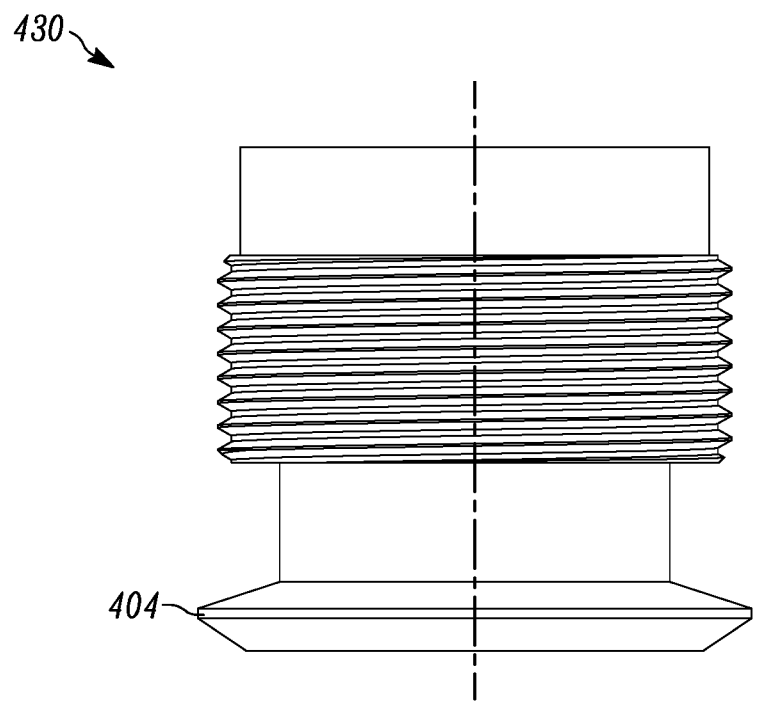
Figure 4C:
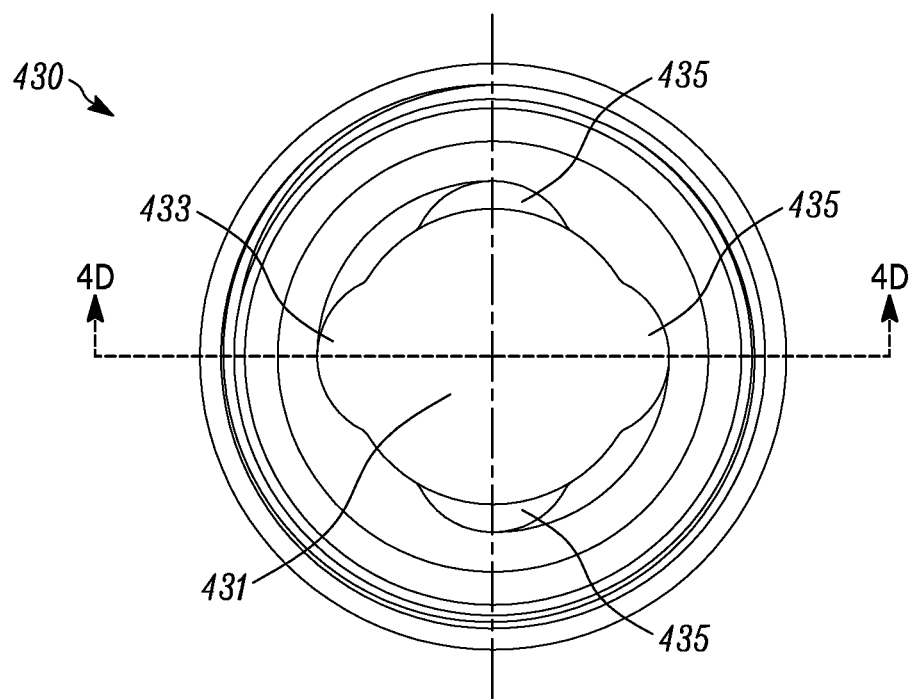
Figure 4D:
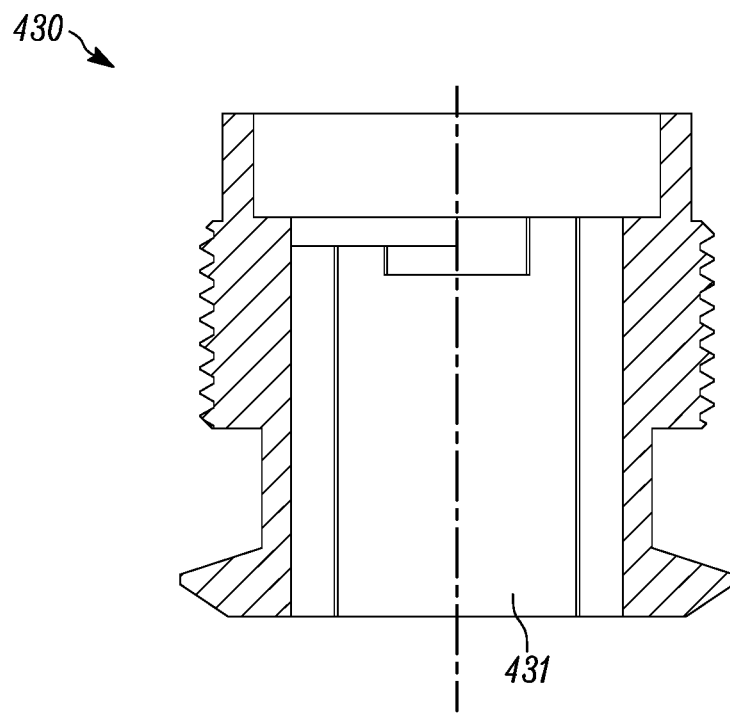

FIG. 3 illustrates a gas stem assembly 301 according to an embodiment of the present invention. The gas stem assembly 301 comprises a gas stem base 302, a vent tube 310, a cup or receiver 330, a spring 332 and a spring sleeve 334. The receiver 330 is configured to attach to the gas stem base 302 with the spring 332 and spring sleeve 334 being positioned between the gas stem base 302 and the receiver 330 to positively lock the vent tube into the receiver or gas stem base with an active engagement.

When assembled, the spring 332 presses against the inside of the gas stem base 302 and biases the spring sleeve 334 toward the receiver 330. In alternative embodiments, the spring sleeve 334 is removed, and the spring directly contacts the gas stem base 302 and the receiver 330. In other alternative embodiments, the receiver 330 is permanently attached to the gas stem base 302 or is a portion of the gas stem base 302, rather than being a separate component. Regardless of the chosen configuration, the biasing mechanism (e.g., spring, etc.) is used to positively lock the vent tube into position to prevent unintentional removal of same and, when desired, the biasing mechanism can be moved to release the vent tube for rapid change out to reduce the amount of downtime for the bottling machinery or line. This active engagement allows the user to ensure the vent tube is properly installed in a quick and easy manner that prevents the risk of unintentional or inadvertent removal of the vent tube during operation of the machinery.

The vent tube 310 has a longitudinal axis 311 and at least one protrusion 316 extending radially outward perpendicular to the longitudinal axis 311 near a first end 315 of the vent tube 310. The embodiment shown in FIG. 4 has two protrusions 316, with the second being directly across from the one that is visible and preferably in a symmetrical layout to help simplify operation. However, in alternate forms a non-symmetrical arrangement may be desired to only afford one orientation that the vent tube can be installed in on the gas stem.

In the form illustrated, at least the first end 315 of the vent tube 310 is configured to pass through a hole or opening 331 passing through the center of the receiver 330 when both are aligned along the longitudinal axis 311. The opening 331 is not circular, as a result the portion of the vent tube 310 having the protrusion 316 can only pass through the opening 331 in certain orientations. The shape of the opening 331 can vary (e.g., to control the number of orientations the vent tube can be placed in that allow insertion of the vent tube into the receiver and/or to dictate the exact positioning require for such insertion). Examples include circular or near circular openings with slots or grooves shaped to allow the protrusion 316 to pass through or ellipses through which the vent tube 310 can pass when the protrusion 316 is aligned with the semi-major axis. The protrusion 316 and opening 331 form a bayonet latch. The spring 332, protrusions 316, and recesses form a positive locking mechanism, with a force being applied by the spring 332 onto the protrusions 316 to maintain their recessed location (or location in the recesses) so that the vent tube 310 remains locked in place. As mentioned above, the spring force may be directly or indirectly applied to the protrusions depending on the selected configuration for the vent tube and receiver assembly. It should be understood that in FIG. 3 the protrusions 316 are not shown aligned with the clearances or openings 331 as they would need to be in order to insert the vent tube 310 into the receiver 330, but rather they are shown turned by a fractional amount (e.g., 33°, 45°, 90°, etc.) to indicate the position they would be in when nested or locked in the receiver 330.

The vent tube 310 further includes one or more annular grooves 317 extending around the outer circumference of the vent tube 310 near the first end 315. In operation, these annular grooves 317 form fluid fillable voids. The presence or flow of fluid within the rings 317 forms fluid seals that operate much like gaskets or o-rings would if positioned in these grooves. Specifically, the fluid seals form a barrier between the gas flowing along the inside of the vent tube 310 and the fluid flowing along the outside of the vent tube 310. The number of annular grooves 317 vary, in a preferred embodiment there are at least two. In alternative embodiments, gaskets or o-rings are positioned inside of the annular grooves 317 to help form a barrier or seal.

In operation, the vent tube 310 is passed through the receiver 330 until protrusion 316 exits the channel formed by opening 331 out the side facing the gas stem base 302. The vent tube 310 is then rotated around the longitudinal axis 311 (which would be the longitudinal axis of the vent tube and receiver) so that the protrusion 316 is not aligned with the opening 331, thus preventing the vent tube 310 from passing back through the receiver 330 in the opposite direction. In some embodiments, the side of the receiver 330 facing the gas stem base 302 includes one or more mating recesses configured to hold the one or more protrusions 316. The recesses are out of alignment with the opening 331 by more than zero degrees (0°) and up to one hundred eighty degrees (180°) or more, so that the protrusion 316 is aligned with the recess when not aligned with the opening 331. In a preferred form, a fractional turn configuration would be used so that the vent tube is rotated a fractional amount (e.g., ¼ turn, ½ turn, etc.) to move the protrusion 316 from alignment with the opening 331 to alignment with the mating recess. When the protrusion 316 is in the mating recess, the rotation of the vent tube 310 about the longitudinal axis 311 is restricted, unless the vent tube 310 is first moved along the longitudinal axis 311 toward the gas stem base 302.

In the form illustrated, the spring sleeve 334 contacts the vent tube 310, biasing the protrusion 316 toward the recess, positively locking the vent tube 310 in position. This reduces the risk of the vent tube 310 rotating and falling out as the result of vibration of the bottling machine 100 or contact with the bottles 105. However, the vent tube 310 can still be quickly removed by a user by pressing the vent tube 310 up against the pressure of the spring 332, rotating the vent tube about the longitudinal axis by up to one hundred eighty degrees (180°) so that the protrusion aligns with the opening 331, and passing the vent tube through the receiver 330.

The protrusions 316 can be any shape, including blade shaped (as shown), cylindrical posts, hemispherical bumps, truncated cones, etc. The mating structures may also include features such as beveling, tapering or bell-mouthing in order to make it easier to start the installation of the vent tube into the receiver (e.g., in a preferred form, a configuration is used that provides greater tolerance for a misaligned vent tube at the start and then guides the vent tube into a tighter tolerance channel as it is inserted into the receiver for proper alignment each and every time).

The embodiment shown in FIG. 3 is a quarter-turn configuration. In this configuration there are two symmetrical protrusions located one hundred eighty degrees (180°) apart around the outer surface of the vent tube 310. The receiver 330 includes two recesses located ninety degrees (90°) out of alignment with the opening 331, so that the vent tube 310 need only be rotated ninety degrees (90°) in either direction to move between a secured state (with the protrusions 316 aligned with the recesses) and an unsecured state (with the protrusions 316 aligned with the opening 311).

An alternative embodiment is a half-turn configuration which comprises a single protrusion 316 and single recess that is 180 degrees out of alignment with the opening 331. This embodiment works in substantially the same way, except the vent tube 310 is rotated by 180 degrees in either direction to transition between states.

Alternative embodiments can be made with any number of protrusions 316 and recesses, with recesses being out of alignment with the opening 331 by any amount.

In some embodiments, the recesses are removed or not present. The side of the receiver 330 facing the gas stem base 302 is flat. In this embodiment, the spring 332 biases the protrusion 316 toward the receiver 330 with enough force that the friction between the protrusion 316 and the receiver 330 prevents the vent tube 310 from inadvertently rotating and detaching from the rest of the gas stem assembly 301. In still other forms, the mating recess may be located in the spring sleeve 334 rather than the receiver 330 so that rotation to the vent tube 310 is permitted until it gets to an end-stop defined by the spring sleeve 334. In such configurations, the design would still allow the user to rotate the vent tube in the opposite direction at all times, but would give the user the comfort and knowledge that they have rotated the vent tube the desired amount by letting the user feel the vent tube reach the end stop. This type of configuration would rely on the friction applied to the vent tube by the spring sleeve to prevent from inadvertent or unintentional removal, however, since it does not lock the vent tube in position or prevent rotational movement, it is not as desired as the main embodiment discussed above.

The vent tube 310 can include the elements of previous vent tubes 110, 210, such as the spreader 112, 212 or any of several undisclosed features that are known in the art. This disclosure is focused on the means for attaching the vent tubes to the gas stems, and thus that element of the vent tubes is shown in greater detail. The overall size and shape of the vent tubes along with the existence and shape of spreaders or other features can vary wildly within the embodiments of the invention described herein.

FIGS. 4A-D illustrate a three point perspective view of a receiver 430 according to an embodiment of the present invention. There is an opening 431 extending through the center of the receiver 430 that is configured to receive a vent tube 310 as described above. The opening 431 is not circular, as it has a groove or elongated portion 433 through which the protrusions 316 on a vent tube 310 can pass. The receiver 430 further comprises one or more recesses 435 configured to hold a protrusion 316 of a vent tube 310.

In operation, the vent tube 310 is rotated so that the protrusion 316 is in line with the elongated portion 433. The vent tube 310 is then partially inserted into the receiver 430 until the protrusion 316 passes through the receiver 430. The vent tube 310 is then rotated until the protrusion 316 aligns with a recess 435. A spring 332 biases the protrusion 316 into the recess 435. When the protrusion 316 is in the recess 435, the vent tube 310 is restricted from rotating. In order to remove the vent tube 310, the vent tube 310 must be pressed against the spring 332 moving the protrusion 316 out of the recess 435, the vent tube 310 can then be rotated until the protrusion 316 aligns with the elongated portion 433 and can be passed back through the receiver 430.

The receiver 430 additionally comprises a gasket 404. The gasket 404 is configured to form a seal with the lip of a bottle 105 so that gas released through the vent tube 310 can be used to pressurize the bottle 105.

Figure 5A:
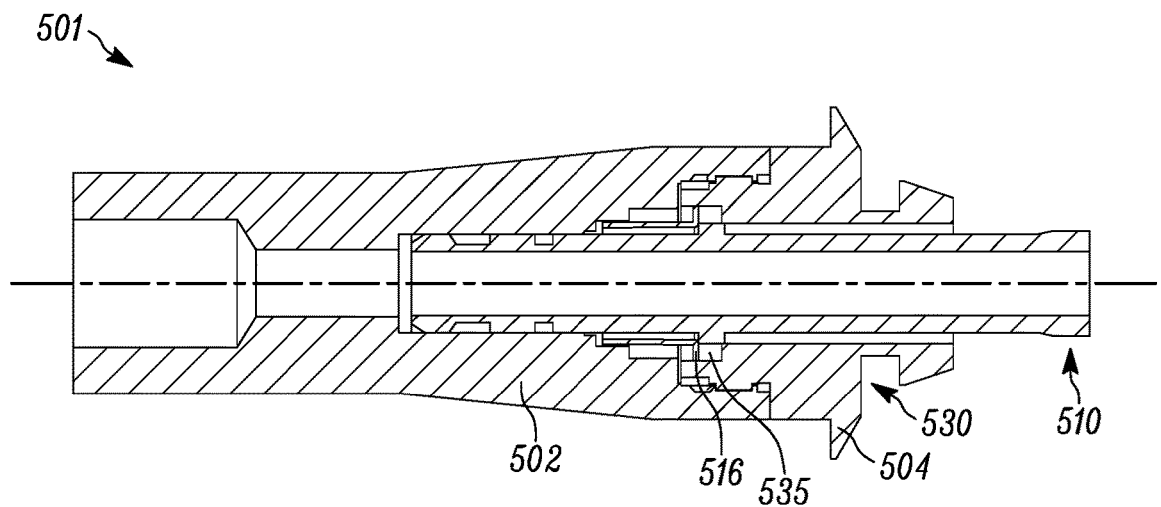
FIGS. 5A-B are respective cross sectional views of a gas stem assembly in a first fully inserted position to allow for locking or unlocking rotational movement of the vent tube and a second seated position wherein the vent tube is locked in position and rotational movement is prohibited.
Figure 5B:
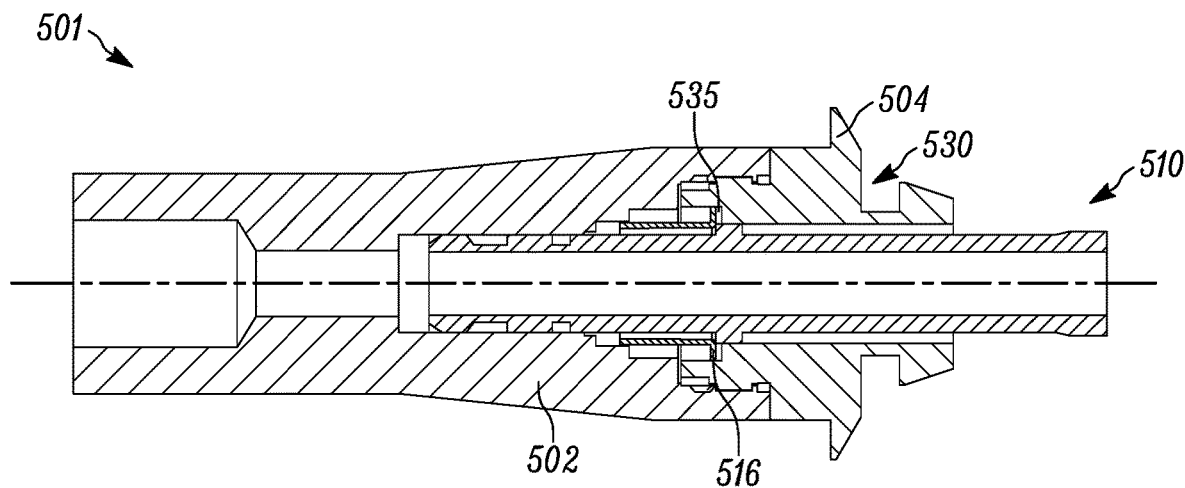

FIGS. 5A-B illustrates a cross sectional view of a gas stem assembly 501. The gas stem assembly 501 includes a vent tube 510 which is removably inserted into a receiver 530 which is in turn removably attached to a gas stem base 502. The receiver 530 has a pair of recesses 535 into which protrusions 516 on the vent tube 510 can rest. There is a gap 551 between the recess 535 and the gas stem base 502 in which the protrusions 516 can travel. As shown above, this gap 551 can contain a spring 302 for biasing the protrusions 516 into the recess 535. There are other gaps 552, 553 between the vent tube 510 and the gas stem base 502. In alternative embodiments, any of these gaps 551, 552, 553 or any combination thereof can contain a spring biasing the vent tube 510 towards the receiver 530 so that it is positively locked in place.

The top image (FIG. 5A) shows the vent tube 510 fully inserted into the receiver 530. In this position, the protrusions 516 are outside of the recesses 535, therefore the vent tube 510 is free to rotate. As described above, when the vent tube 510 is rotated to a certain orientation, it is free to pass through the receiver 530 to be removed. The bottom image (FIG. 5B) shows the vent tube 510 in the locked position wherein the protrusions 516 are located within the recesses 535. In this position, rotation of the vent tube 510 is restricted.

Figure 5C:
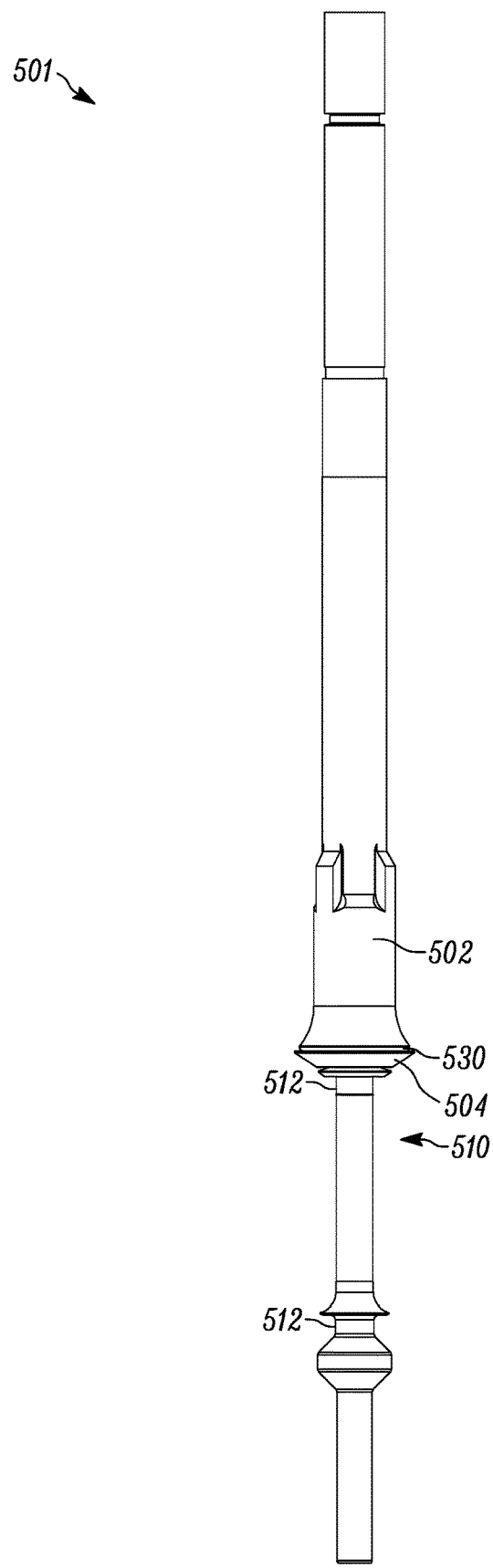
FIG. 5C is a front elevation view of the gas stem assembly of FIG. 5A.

FIG. 5C illustrates the gas stem assembly 501 of FIGS. 5A-B. The gas stem assembly further comprises a gasket 504 and flow features 512. As shown in previous embodiments, the flow features 512 can comprise spreaders 112, 212. Stainless steel spreaders are frequently used for bottling soda and other carbonated soft drinks and/or when bottling into plastic bottles. In some embodiments, rubber spreaders are used, such as when bottling certain beers or ales and/or when bottling into glass bottles. Still in further embodiments, such as shown in FIG. 5C, there are no spreaders. Instead the flow features 512 comprise a pair of annular grooves. The flow features 512 are configured to alter the flow of a liquid, such as beer, that is running along the outer surface of the vent tube 510 in order to aid in the rapid filling of bottles. In some forms, these annular grooves can be filled with spreaders of varying size or shape depending on the liquid being bottled and/or the bottle being filled.

Figure 6A:
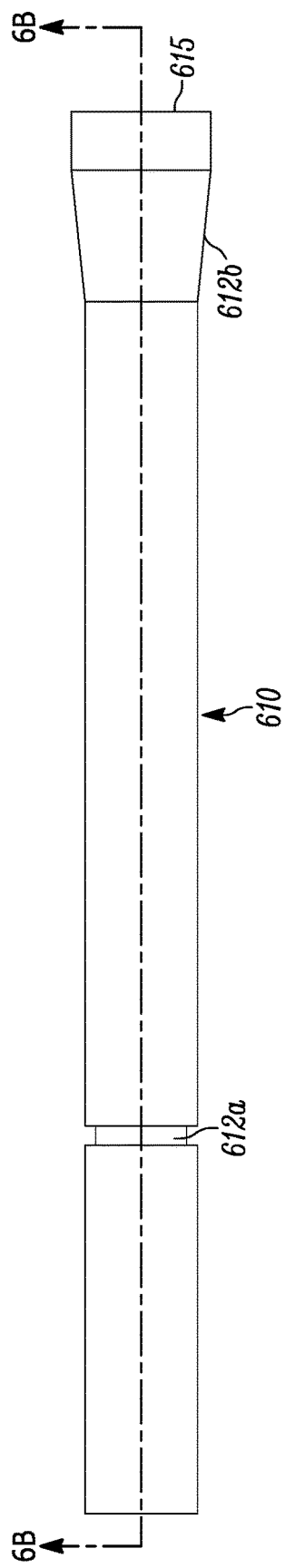
FIGS. 6A-B are side elevation and cross sectional views, respectively, of a gas stem according to an embodiment of the present invention with the cross section taken along line 6B-6B in FIG. 6A.
Figure 6B:
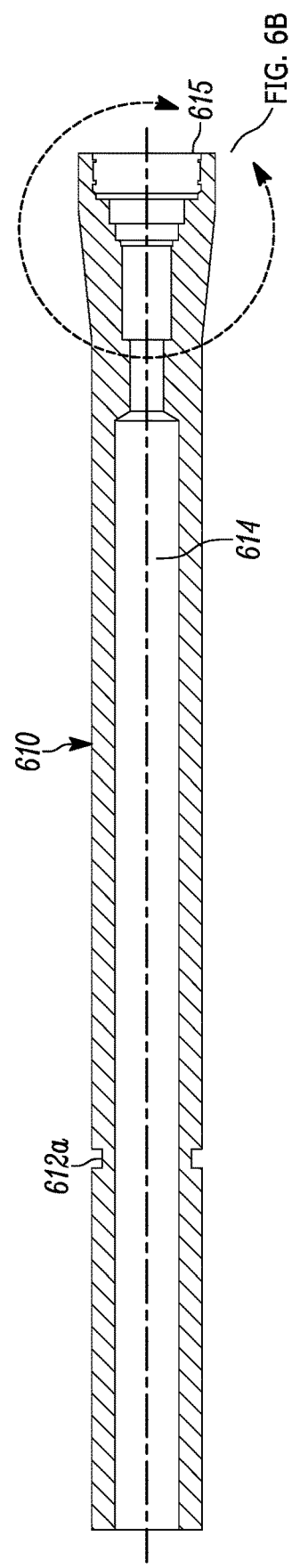
Figure 6C:
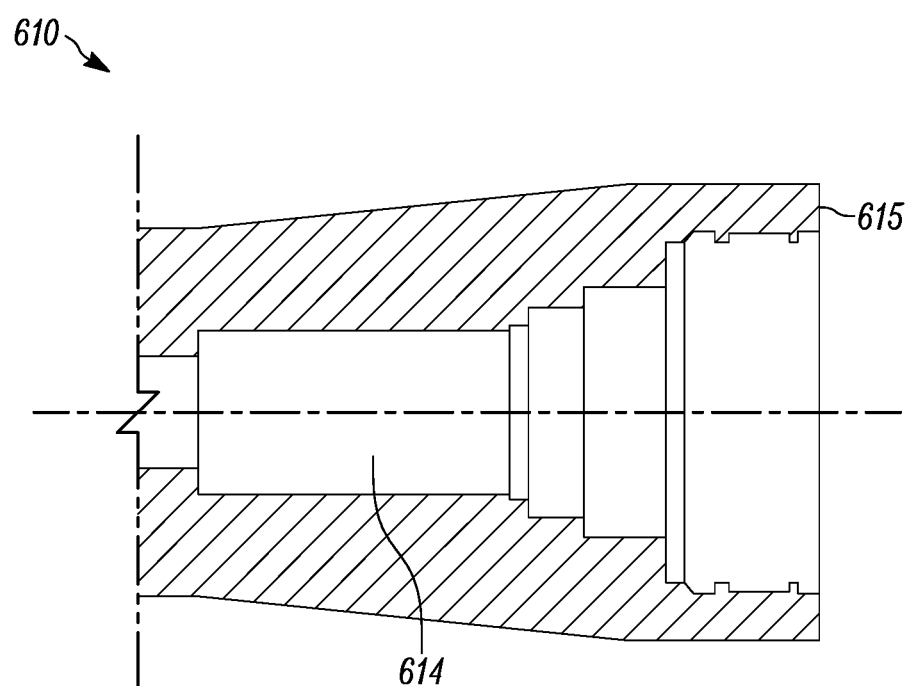
FIG. 6C is an enlarged or expanded view of the end of the gas stem of FIG. 6B.

An alternative vent tube 610 design is shown in FIGS. 6A-C. The vent tube 610 comprises a hollow, cylindrical body having a pair of flow features 612a and 612b as shown in FIG. 5A. The first flow feature 612a is an annular groove. The second flow feature 612b is a tapered portion of the vent tube 610. The tapered portion 612b is near the first end 615 of the vent tube 610, where the vent tube would be inserted into a receiver 530 and is meant to form a seat for the spreader or a place where the spreader can be positioned or nested to ensure proper placement of same.

The vent tube 610 further comprises an opening 614 extending the entire length of the vent tube 610. Unlike the uniform cylindrical openings 114 shown above, the opening 614 in the present embodiment steps up in size near the first end 615. And expanded view of these steps are shown in FIG. 6C. The increase in cross section of the opening 614 near the first end 615 reduces the velocity of the gas being vented from the bottle as it enters the gas stem base 502.

Figure 7:
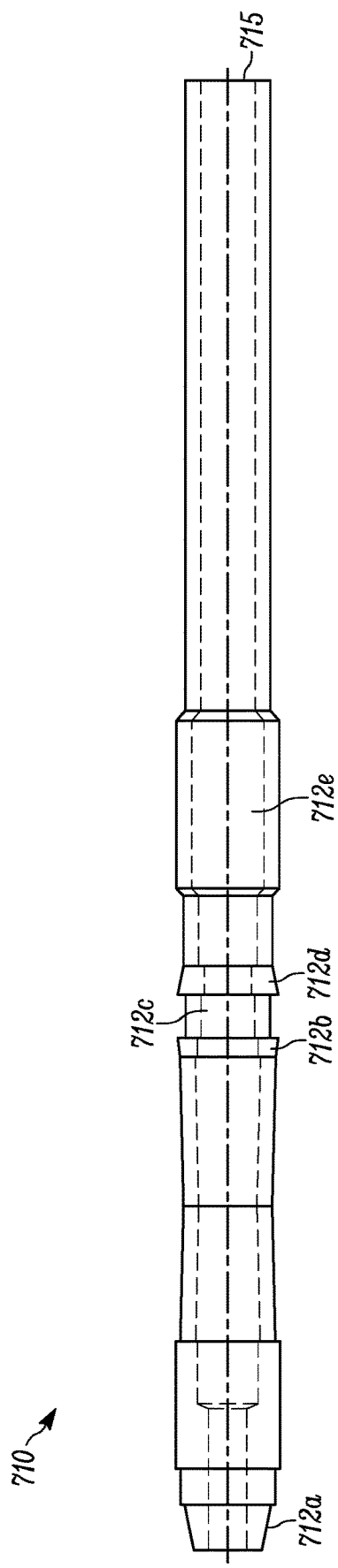
FIG. 7 is a side elevation view of a gas stem according to an embodiment of the present invention.

Another embodiment of a vent tube 710 is illustrated in FIG. 7. The vent tube 710 includes a variety of flow features 712a-e. The vent tube 710 has a tapered end 712a, a reverse umbrella 712b, an annular groove 712c, an umbrella 712d, and a plurality of milled flats 712e. Depending on the type of bottle being filled and the type of liquid being added to the bottle, the combination of features shown in this and previous embodiments can vary. For example, a variety of rubber spreaders could be fit into the annular groove 712c as desired. Other flow features not shown are also possible. For example, any of the features discussed with one embodiment above could equally be used with features of other embodiments discussed above to form further configurations intended to be covered herein.

FIGS. 8A-8E illustrate a fractional turn receiver 830 for use in combination with any of the above vent tubes and/or gas stem assemblies. The receiver 830 has at least one through-opening, such as groove or elongated portion 833, which, when aligned with the protrusion 316 of a vent tube allows the vent tube to pass at least partially through the receiver 830. The receiver 830 further includes at least one recess 835 in which a protrusion 316 rests or may be at least partially nested. The groove or elongated portion 833 and the recess 835 both extend radially outward from the center axis of the receiver, to provide clearance for the protrusions 316. A groove or clearance 836 in the receiver 830 extends along the inner surface of the receiver 830 between the elongated portion 833 and the recess 835. This groove or clearance 836 provides space for the protrusion 316 to fit when the vent tube 310 is pushed all the way in so as to allow the vent tube 310 to rotate. Because there is no corresponding groove or clearance 836 on the opposite side of the elongated portion 833 and recess 835 there is not enough clearance in those directions for the protrusion 316 to pass. Thus, the groove or clearance 836 forms a limited area of travel, with travel limits being located at either end of the groove (one at the elongated portion 833 and the other at the recess 835). As such, the vent tube 310 is only rotatable in one direction, towards the recess 835, from either the elongated portion 833. Similarly, the vent tube 310 is only rotatable in one direction, towards the elongated portion 833, from the recess 835. In some forms, there is a corresponding second set of elongated portion 833, recess 835 and clearance 836 on the opposite side of the receiver 830 which correspond to a second protrusion 816 on the vent tube 810.

Figure 8A:
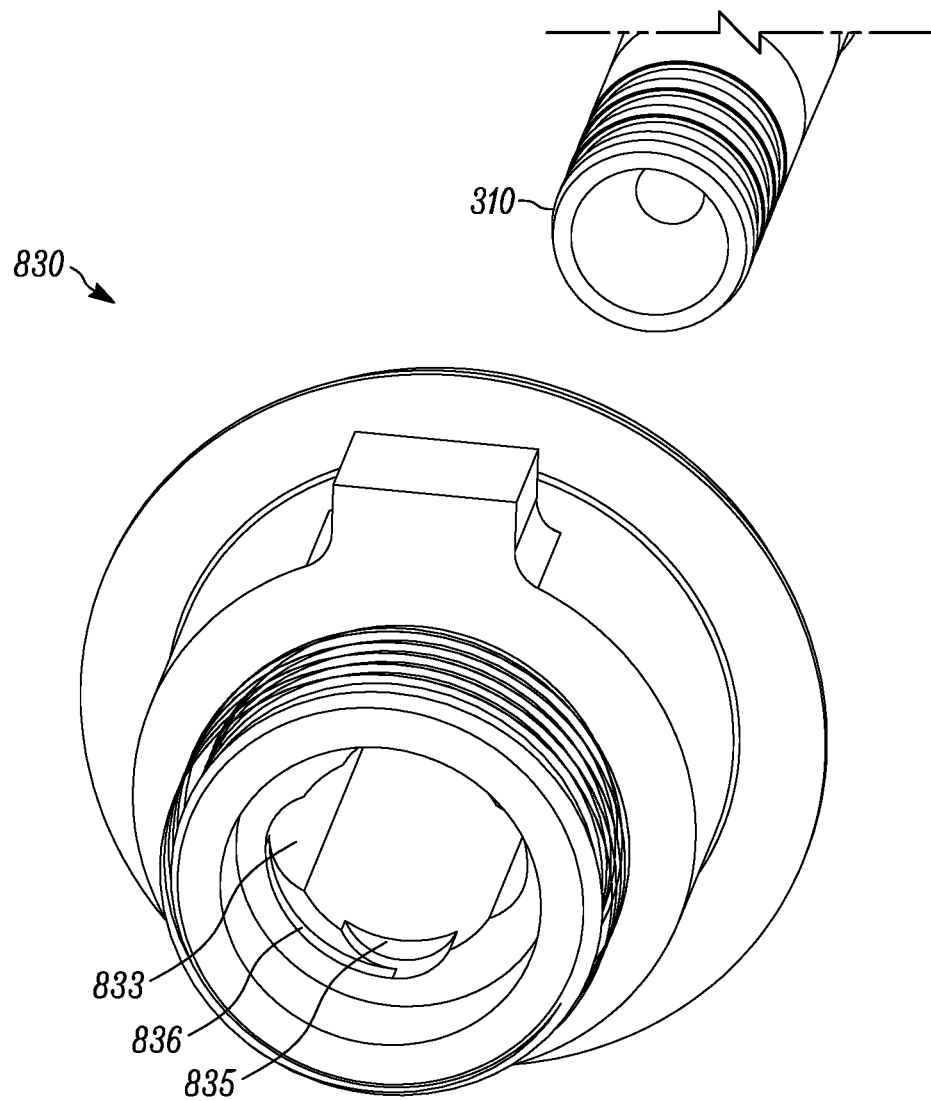
FIG. 8A is a perspective view of a receiver according to an embodiment of the present invention.
Figure 8B:
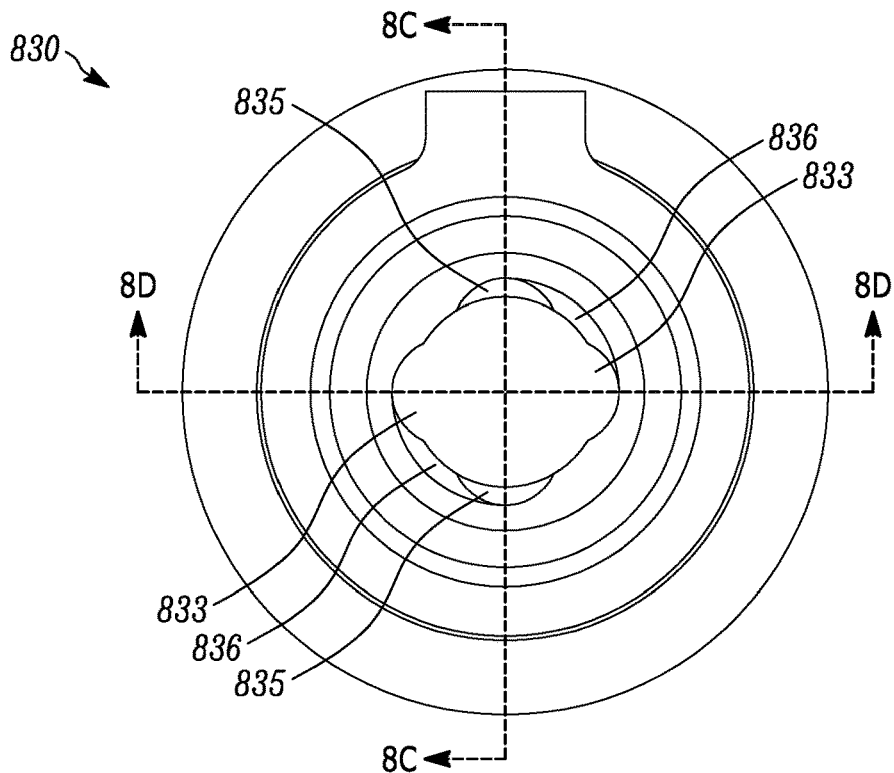
FIG. 8B is an end view of the receiver of FIG. 8A.
Figure 8C:
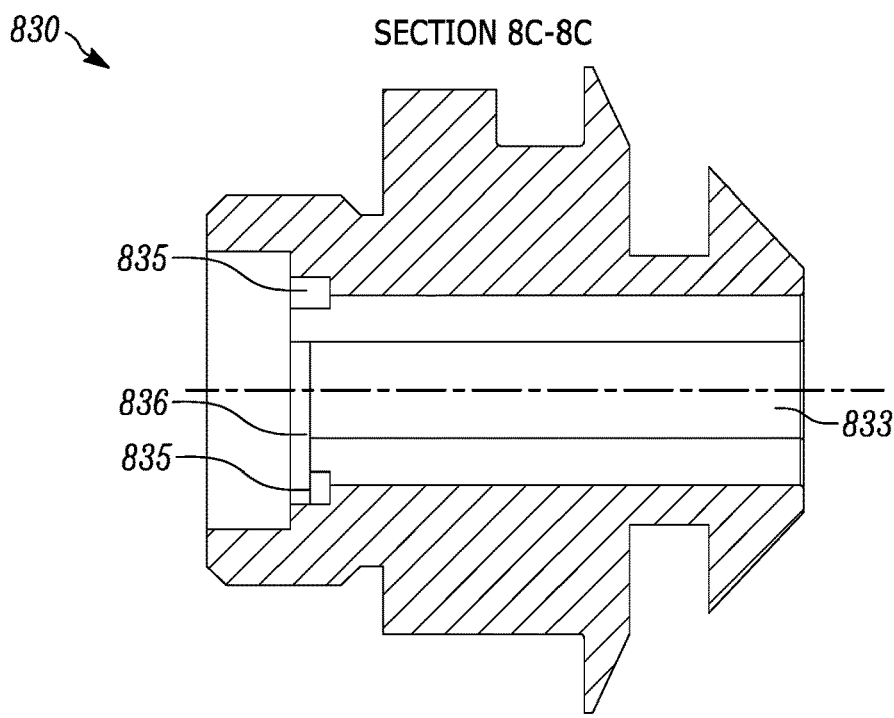
FIG. 8C is a cross section view of the receiver of FIGS. 8A-8B taken along lines 8C-8C in FIG. 8B.
Figure 8D:
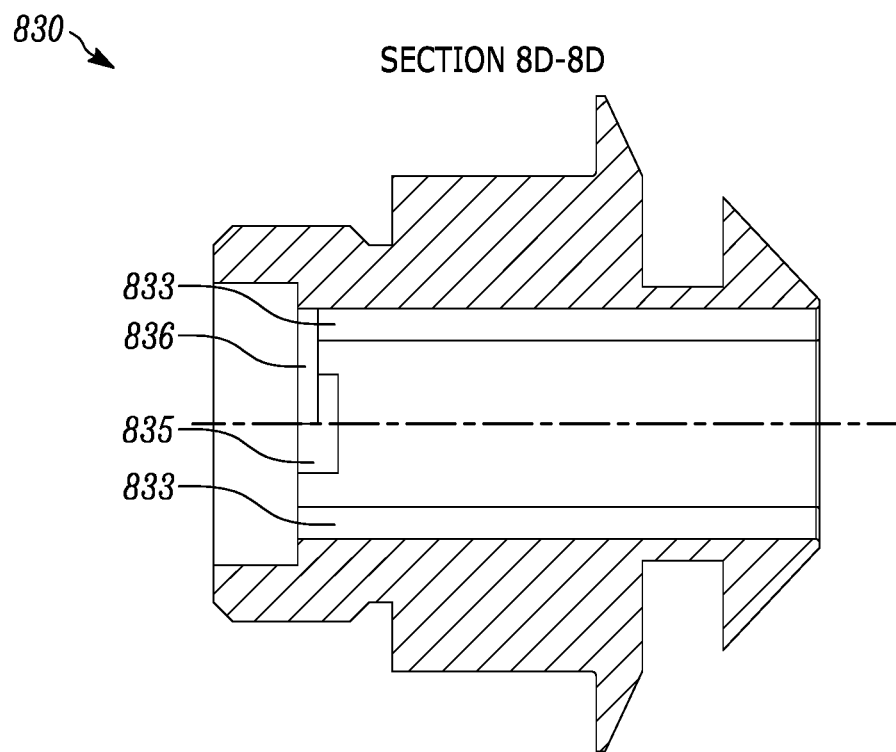
FIG. 8D is a second cross section view of the receiver of FIGS. 8A-8C taken along lines 8D-8D in FIG. 8B.

As best shown in FIG. 8B, there is a channel 836 on only one side of each of the elongated portions 833. When a vent tube is inserted into the receiver 830 with the protrusions 316 aligned with the elongated portions the vent tube can be rotated counterclockwise (from the point of view shown in FIG. 8B) due to the clearance provided by the channels or clearances 836. Once rotated a fraction of a full turn, the fraction being determined by the length of the clearances 836, the protrusions 316 contact the far side of the recesses 835 causing the vent tube to stop rotating. The absence of a clearances 836 in the clockwise direction of the elongated portions 833 prevents the vent tube from being rotated clockwise after insertion. FIG. 8B is taken from the top of the receiver, or the end inserted into the gas stem. Therefore from the point of view of the inserter, the rotation from the insertion position to the locked position is a clockwise rotation, conforming to the standard right hand turn to tighten method.

In operation, the vent tube 310 is oriented such that the protrusion or protrusions 816 align with the grooves or elongated members 835. The vent tube 810 is then fully inserted into the receiver and rotated a fraction of the way around. In one embodiment, the fractional rotation is ninety degrees (90°). After rotating ninety degrees)(90° (or in alternative embodiments after any predetermined angle, such as forty-five degrees (45°) or one hundred eighty degrees (180°)), the protrusions 816 contact the opposite sides of the recesses 835 where there is no clearance 836. Because there is no clearance 836, there is insufficient room for the protrusions 816 to fit above the receiver 810 and thus then are stopped from continuing to rotate. When the operator feels this stop, they simply release the vent tube 810 and gravity and/or the spring 332 push the vent tube 310 downward such that the protrusions 316 rest in the recesses 835.

In an alternative embodiment, there is clearance for the protrusions 316 round the entire circumference of the receiver 830 except for blocks, such as protrusions, on one side of each recess 835 and each elongated portion 833. These blocks serve the same purpose as the clearance 836 described above, namely as travel limits which only allowing the vent tube 310 to rotate in one direction from either the recesses 835 or the elongated portions 833 and stopping rotation at the other.

Figure 9:
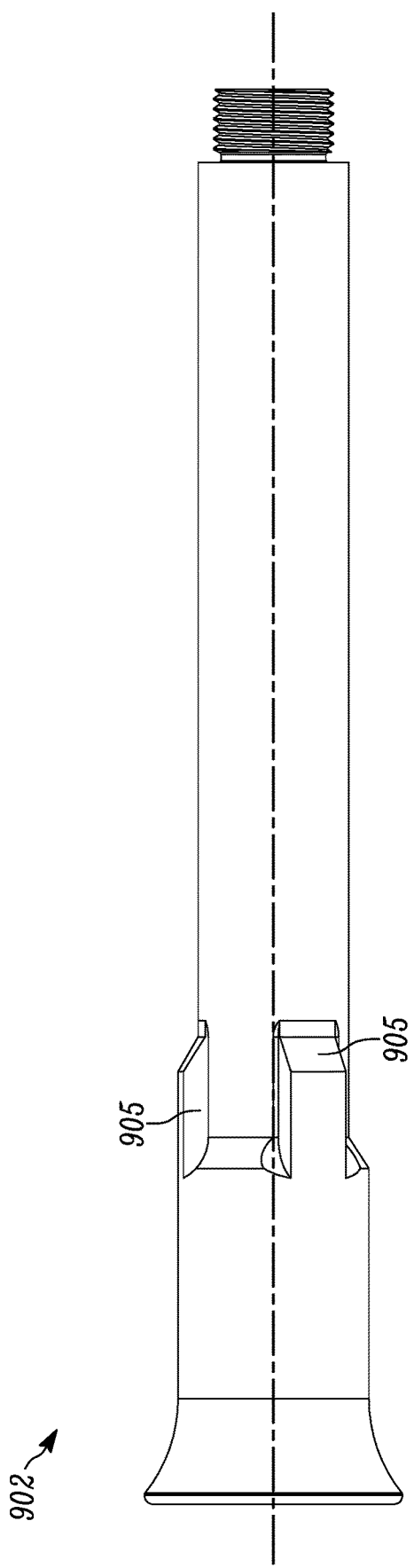
FIG. 9 is a side elevation view of a gas stem according to an embodiment of the present invention.

FIG. 9 illustrates a gas stem 902 usable with any of the receivers or vent tubes described above. The gas stem 902 includes a plurality of prongs 905. The prongs 905 extend upward along the body of the gas stem 902. In operation, the gas stem extends upward into a housing, such as the lower housing 14 shown in FIG. 1C. The housing includes corresponding grooves or recesses into which the prongs 905 extend and/or corresponding protrusions that extend into the channels defined by the prongs 905. In a preferred embodiment, the fit between the prongs 905 and the corresponding structure in the housing is slightly loose, allowing for some tolerance when assembling the valve assembly. In a preferred embodiment there is $\frac{1}{16}$th of an inch to $\frac{1}{4}$ of an inch of tolerance. The number of prongs can vary. In a preferred embodiment there are between one and five prongs. In a more preferred embodiment there are three prongs. In alternative embodiments, the prongs 905 are replaced with grooves, channels, beads, flat areas, or some other structure capable of interfacing with corresponding structure in the housing.

Figure 8E:
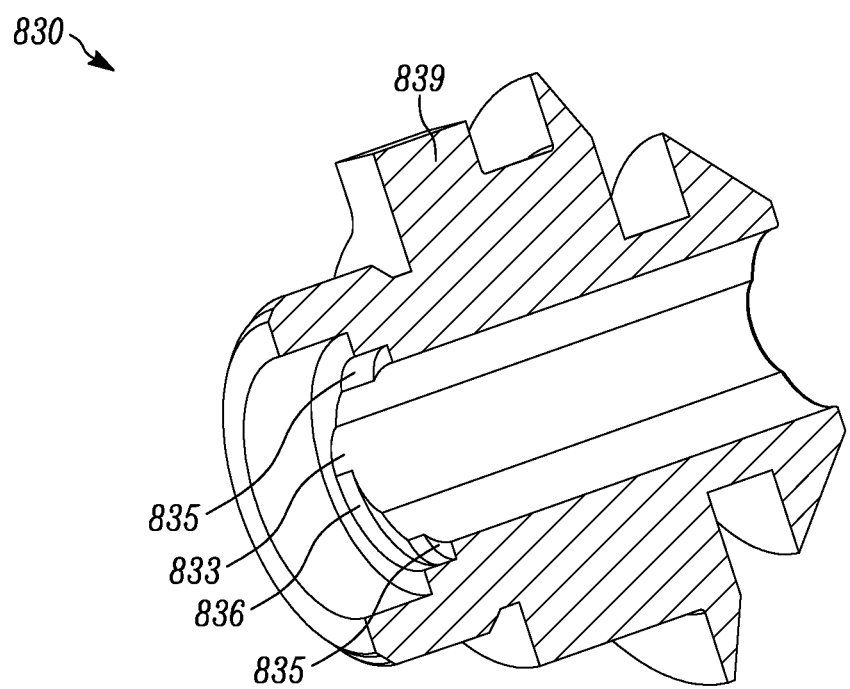
FIG. 8E is a perspective cross section view of the receiver of FIG. 8C.

The prongs 905 serve to prevent the gas stem 902 from being unthreaded from the valve assembly as a result of torque applied to the receiver 830 and/or the vent tube 310. As best shown in FIG. 8E, the receiver 830 may additionally include one or more protrusion or prong 839. The prong 839 similarly has corresponding structure in the housing of the valve assembly which prevents the receiver 830 from coming unscrewed from the gas stem 902 as a result of torque exerted on the vent tube 310. In alternative embodiments, the prong 839 is replaced with one or more grooves, channels, beads, flat areas, or some other structure capable of interfacing with corresponding structure in the housing.

In order to change the receiver 830 and/or the gas stem 902, the receiver 830 and gas stem 902 are moved down relative to the housing until they protruding from the housing and the prongs 905, 839 are no longer contacting the corresponding structure in the housing. While specific designs have been illustrated for the vent tube and gas stem mating configuration, it should be understood that numerous other designs may be used while still complying with the spirit of the invention. For example, different shaped protrusions and mating receptacles or channels could be used in other embodiments. Similarly, while the disclosure herein focuses on the vent tube, it should be understood that this disclosure covers vent tubes, gas stems, gas stem receivers, and, in general, the mating configuration between the vent tube and gas stem.

In addition to the above-mentioned embodiments, it should be understood that a variety of methods are also disclosed herein. For example, a method of attaching a vent tube or assembling a gas stem assembly. As is methods of manufacturing the devices described herein, and operating a bottling machine having the devices described herein. These and other methods related to the subject matter set forth herein are intended to be covered by this disclosure. It should also be understood that while certain features have been described with certain embodiments, these features may be intermixed or interchanged with one another to form other embodiments as desired. All features disclosed herein are intended to be used in any of the embodiments disclosed herein either in lieu of similar features or in combination with other features.

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method of connecting a vent tube to a gas stem of a bottling machine using a positive lock comprising:
   providing a vent tube having at least one alignment mechanism, a receiver defining at least a portion of a non-circular through-opening to allow the vent tube to be inserted into or removed from the receiver, and a biasing mechanism for biasing against at least a portion of the vent tube;
   rotating the vent tube to align the at least one alignment mechanism with the non-circular through-opening such that the at least one alignment mechanism is able to be inserted into the non-circular through-opening;
   inserting the vent tube into the receiver against the biasing mechanism; and
   rotating the vent tube such that the at least one alignment mechanism is not aligned with the non-circular through-opening so that the vent tube is secured to the receiver.

2. The method of claim 1 wherein the at least one alignment mechanism is a protrusion and the receiver further defines a recess for receiving at least a portion of the at least one alignment mechanism protrusion and rotating the vent tube to secure the vent tube to the receiver comprises rotating the vent tube such that the at least a portion of the at least one alignment mechanism protrusion is nested in the recess defined by the receiver to hinder rotational movement of the vent tube.

3. The method of claim 1 wherein the biasing mechanism is a spring for directly or indirectly biasing against the at least a portion of the vent tube and the method comprises compressing the spring to allow the vent tube to be moved between a first position wherein the vent tube is removed from the receiver and a second position wherein the at least a portion of the at least one alignment mechanism is nested in the recess defined by the receiver.

4. The method of claim 1 wherein the at least one alignment mechanism is a plurality of protrusions extending from and positioned about the vent tube, and the non-circular through-opening includes a plurality of recessed channels through which the plurality of protrusions travel as the vent tube is inserted into the receiver and rotating the vent tube to align the at least one alignment mechanism with the non-circular through-opening includes aligning the protrusions with the recessed channels to guide the vent tube as it is inserted into the receiver.

5. The method of claim 4 wherein the plurality of protrusions include first and second protrusions located on opposite sides of the vent tube and the plurality of recessed channels include first and second recessed channels located on opposite sides of the receiver and inserting the vent tube comprises aligning the first protrusion with the first recessed channel and the second protrusion with the second recessed channel so that the vent tube is guided as it is inserted into the receiver.

6. A method of connecting a vent tube to a gas stem of a bottling machine using a positive lock comprising:
providing a vent tube having at least one alignment mechanism, a receiver defining at least a portion of a through-opening to allow the vent tube to be inserted into or removed from the receiver, and a biasing mechanism for biasing against at least a portion of the vent tube;
aligning the at least one alignment mechanism with the through-opening;
inserting the vent tube into the receiver against the biasing mechanism; and
rotating the vent tube such that the at least one alignment mechanism is not aligned with the through-opening so that the vent tube is secured to the receiver,
wherein the at least one alignment mechanism is a protrusion and the receiver further defines a recess for receiving at least a portion of the at least one alignment mechanism protrusion and rotating the vent tube comprises rotating the vent tube such that the at least a portion of the at least one alignment mechanism protrusion is nested in the recess defined by the receiver to hinder rotational movement of the vent tube,
wherein the biasing mechanism comprises a sleeve and spring and the method further comprises biasing at least a portion of the sleeve against the at least a portion of the vent tube to encourage nesting of the at least a portion of the at least one alignment mechanism protrusion in the recess defined by the receiver.

7. A method of connecting a vent tube to a gas stem of a bottling machine using a positive locking feature comprising:
providing a vent tube having at least one vent tube alignment mechanism, a receiver defining at least a portion of a through-opening having at least one receiver alignment mechanism formed along the through-opening such that the through-opening has a non-circular cross-section, the at least one receiver alignment mechanism for aligning with the vent tube alignment mechanism to allow the vent tube to be inserted into or removed from the receiver, and a biasing mechanism for biasing against at least a portion of the vent tube;
aligning the vent tube with the through-opening and the at least one vent tube alignment mechanism with the at least one receiver alignment mechanism such that the at least one vent tube alignment mechanism is able to be inserted into the non-circular through-opening;
inserting the vent tube into the receiver against the biasing mechanism;
rotating the vent tube such that the at least one vent tube alignment mechanism is not aligned with the at least one receiver alignment mechanism so that the vent tube is secured to the receiver; and locking the vent tube to the receiver using the biasing mechanism to bias the at least one vent tube alignment mechanism out of alignment with the receiver alignment mechanism to form a positive locking feature that keeps the vent tube connected to the receiver throughout bottling machine operations.

8. The method of claim 7 wherein the at least one vent tube alignment mechanism is a protrusion and the at least one receiver alignment mechanism is a recessed channel for receiving and guiding the protrusion as the vent tube is inserted into the receiver and aligning the vent tube comprises aligning the vent tube protrusion with the recessed channel of the receiver so that the protrusion will travel within the recessed channel to allow the vent tube to be inserted into the receiver.

9. The method of claim 8 wherein the protrusion includes first and second protrusions extending from opposite sides of the vent tube and the recessed channel includes first and second recessed channels located on opposite sides of the receiver and aligning the vent tube comprises aligning the first protrusion with the first recessed channel and aligning the second protrusion with the second recessed channel so that the vent tube may be inserted into the receiver.

10. The method of claim 9 wherein the receiver further defines first and second nests for receiving the first and second protrusions respectively when the vent tube is inserted into the receiver and the vent tube and first and second protrusions are rotated out of alignment with the first and second recessed channels, and locking the vent tube to the receiver comprises using the biasing mechanism to bias the first and second protrusions into the first and second nests to form a positive locking feature that keeps the vent tube connected to the receiver throughout bottling machine operations.

11. The method of claim 7 wherein the at least one receiver alignment mechanism is a protrusion and the at least one vent tube alignment mechanism is a recessed channel for receiving and guiding the protrusion as the vent tube is inserted into the receiver and aligning the vent tube comprises aligning the receiver protrusion with the recessed channel of the vent tube so that the protrusion will travel within the recessed channel to allow the vent tube to be inserted into the receiver.

12. The method of claim 11 wherein the protrusion includes first and second protrusions extending from opposite sides of the receiver and the recessed channel includes first and second recessed channels located on opposite sides of the vent tube and aligning the vent tube comprises aligning the first protrusion with the first recessed channel and aligning the second protrusion with the second recessed channel so that the vent tube may be inserted into the receiver.

13. The method of claim 12 wherein the vent tube further defines first and second nests for receiving the first and second protrusions respectively when the vent tube is inserted into the receiver and rotated such that the first and second protrusions are out of alignment with the first and second recessed channels, and locking the vent tube to the receiver comprises using the biasing mechanism to bias the first and second protrusions into the first and second nests to form a positive locking feature that keeps the vent tube connected to the receiver throughout bottling machine operations.

* * * * *